UNITED STATES PATENT OFFICE.

GERVAIS BAILLIO, OF NIAGARA FALLS, NEW YORK, ASSIGNOR TO ISCO CHEMICAL COMPANY, OF NIAGARA FALLS, NEW YORK, A CORPORATION OF NEW YORK.

PROCESS OF SEPARATING CARBON TETRACHLORID FROM OTHER COMPOUNDS.

1,260,621.     Specification of Letters Patent.     Patented Mar. 26, 1918.

No Drawing.     Application filed April 30, 1917. Serial No. 165,543.

*To all whom it may concern:*

Be it known that I, GERVAIS BAILLIO, a citizen of the United States, residing at Niagara Falls, in the county of Niagara and State of New York, have invented certain new and useful Improvements in Processes of Separating Carbon Tetrachlorid from other Compounds; and I do hereby declare the following to be a full, clear, and exact description of the invention, such as will enable others skilled in the art to which it appertains to make and use the same.

This invention relates to a process of separating carbon terra-chlorid from certain other compounds with which it may be mixed, and has for its object to provide a method which will be more efficient in operation and less costly to carry out than those heretofore proposed.

With these and other objects in view the invention consists in the novel steps and combinations of steps constituting the process all as will be more fully hereinafter disclosed and particularly pointed out in the claims.

In my copending application Serial No. 163,684, filed April 21, 1917, and entitled Process of making carbon tetra-chlorid and by-products, I have disclosed a process in which free chlorin is led into carbon bi-sulfid containing some free sulfur or some sulfur mono-chlorid, so that the said chlorin reacts with the free sulfur present to form sulfur mono-chlorid, and this latter immediately reacts in the presence of a catalyzer, with the carbon bi-sulfid present to produce the desired carbon tetra-chlorid and to liberate the sulfur of the carbon bi-sulfid.

Owing to the fact that sulfur is thus continuously freed from the carbon bi-sulfid present in the mixture, it is evident that if a proper quantity of free chlorin is employed, all the carbon bi-sulfid may be used up and only carbon tetra-chlorid and sulfur mono-chlorid will appear in the final mixture.

On the other hand, if an insufficient quantity of chlorin is employed, or if no chlorin at all is employed, and the carbon bi-sulfid is simply mixed with sulfur mono-chlorid, then the final mixture obtained will contain not only carbon tetra-chlorid and sulfur mono-chlorid, but it will also contain more or less carbon bi-sulfid and free sulfur, the latter being partly in solution.

The complete and efficient separation of the constituents of the final mixtures in either of the above mentioned cases by fractionation can only be accomplished with great difficulty and at considerable loss of the products. I have discovered, on the other hand, that a separation of these said constituents in each of the above mentioned cases can be simplified by taking advantage of the fact that sulfur mono-chlorid combines with certain metals and their corresponding sulfid, as well as with some organic compounds, and therefore, that the said sulfur mono-chlorid can be eliminated as such from the mixtures in each case.

Accordingly, in carrying out my present invention I proceed as follows:—I preferably add to the mixture containing the sulfur mono-chlorid a sufficient quantity of metallic tin to decompose all of the said sulfur mono-chlorid into tin tetra-chlorid and free sulfur, but instead of using metallic tin, I may use a tin lead alloy, or I may add a tin compound such as tin sulfid. Other metals than tin may also be employed, such for example, as antimony or arsenic, as well as their sulfids, and even organic compounds may be used, such for example, as the well known corn-oil of commerce.

In the case of the metals, the chlorin will react to form the corresponding chlorids and free sulfur will be produced as a by-product.

Sufficient tin being employed to decompose all of the sulfur mono-chlorid present in the mixture, the said mono-chlorid disappears as such and after the reaction is complete there remains, in the case of the process disclosed in my said application above, a mixture containing free sulfur, tin tetra-chlorid, and carbon tetra-chlorid. In the other two cases mentioned, the said mixture will contain carbon bi-sulfid as well. The free sulfur in each case can be readily separated out as by decantation or by filtration, or the liquids may be distilled off from the sulfur in each case.

The sulfur being thus eliminated, water may be added to the mixture, in each case, in a quantity just sufficient to hydrate the tin tetra-chlorid present, whereupon the carbon tetra-chlorid may be distilled off, if no carbon bi-sulfid is present, and thus a complete separation be had. On the other hand, if carbon bi-sulfid is present, both the carbon bi-sulfid and the carbon tetra-chlorid may be distilled off, and the two liquids later separated as by fractionation, or the carbon bi-sulfid can be readily converted into carbon tetra-chlorid by the process disclosed in my said application above.

Instead of limiting the quantity of water added to an amount just sufficient to hydrate the tin tetra-chlorid present, a quantity of water sufficient to form a solution of the tin tetra-chlorid may be added to the mixture in which case either the carbon tetra-chlorid present, or the mixture of the carbon tetra-chlorid and the carbon bi-sulfid may be separated from the solution of the tin tetra-chlorid by taking advantage of the differences in their specific gravities. The carbon tetra-chlorid and the carbon bi-sulfid thus separated out may in turn be separated from each other as by fractionation or by converting the carbon bi-sulfid into carbon tetra-chlorid according to the process of my said application mentioned above.

It will be observed that each of the steps now disclosed can be conveniently and easily carried out, and that the efficiency of the separation in each case is high, so that a minimum loss of product is had.

It is obvious that those skilled in the art may vary the details of the process without departing from the spirit of the invention, and therefore, I do not wish to be limited to the above disclosure except as may be required by the claims.

What I claim is:—

1. The process of separating carbon tetra-chlorid from sulfur mono-chlorid mixed with said carbon tetra-chlorid which consists in decomposing said sulfur mono-chlorid into free sulfur and a chlorin compound of another substance, substantially as described.

2. The process of separating the constituents of a mixture containing carbon tetra-chlorid and sulfur mono-chlorid which consists in reacting on said sulfur mono-chlorid with a metal in a sufficient quantity to take up substantially all the chlorin in said mono-chlorin, and then separating the constituents of the new mixture thus formed, substantially as described.

3. The process of separating carbon tetra-chlorid from sulfur mono-chlorid mixed therewith which consists in adding to the mixture a substance containing sufficient tin to decompose substantially all the sulfur mono-chlorid present; separating out the sulfur resulting from the decomposition; and separating the tin tetra-chlorid thus formed from the carbon tetra-chlorid present, substantially as described.

4. The process of separating carbon tetra-chlorid from sulfur mono-chlorid mixed therewith which consists in adding to the mixture sufficient metallic tin to decompose substantially all the sulfur mono-chlorid present; and suitably separating the sulfur and the tin tetra-chlorid thus formed from the carbon tetra-chlorid present, substantially as described.

5. The process of separating carbon tetra-chlorid from a mixture containing sulfur mono-chlorid which consists in adding sufficient tin to said mixture to free the sulfur of said sulfur mono-chlorid and to form tin tetra-chlorid; separating out the sulfur present in the mixture; adding water to the said tin tetra-chlorid; and separating out the latter, substantially as described.

6. The process of separating carbon tetra-chlorid from a mixture containing sulfur mono-chlorid and carbon bi-sulfid which consists in adding sufficient tin to said mixture to decompose substantially all the sulfur mono-chlorid present thus producing free sulfur and tin tetra-chlorid; separating out the free sulfur present; adding water to the mixture; segregating the carbon tetra-chlorid and the carbon bi-sulfid from the tin tetra-chlorid; and separating the said carbon bi-sulfid from said carbon tetra-chlorid, substantially as described.

7. The process of separating carbon tetra-chlorid from a mixture containing sulfur mono-chlorid and carbon bi-sulfid, which consists in adding sufficient tin to said mixture to decompose substantially all the sulfur mono-chlorid present thus producing free sulfur and tin tetra-chlorid; separating out the free sulfur present; adding sufficient water to hydrate the tin tetra-chlorid present; and separating the carbon tetra-chlorid and the carbon bi-sulfid from the said hydrated tin tetra-chlorid by distillation, substantially as described.

In testimony whereof I affix my signature in presence of two witnesses.

GERVAIS BAILLIO.

Witnesses:
MARIE KEELTY,
EBEN P. SPEIDEN.